United States Patent [19]
Worley et al.

[11] Patent Number: 5,481,742
[45] Date of Patent: Jan. 2, 1996

[54] PRINTER CONTROL APPARATUS FOR REMOTELY MODIFYING LOCAL PRINTER BY CONFIGURATION SIGNALS FROM REMOTE HOST TO PRODUCE CUSTOMIZED PRINTING CONTROL CODES

[75] Inventors: Michael E. Worley, Beavercreek; James M. Armstrong, Enon, both of Ohio

[73] Assignee: Reed Elsevier Inc., Newton, Mass.

[21] Appl. No.: 126,713

[22] Filed: Sep. 27, 1993

Related U.S. Application Data

[63] Continuation of Ser. No. 519,601, May 4, 1990, abandoned.
[51] Int. Cl.⁶ .............................. G06F 3/12; G06F 9/06
[52] U.S. Cl. ...................... 395/800; 395/101; 395/109; 364/235
[58] Field of Search ................................ 395/275, 325, 395/500, 800

[56] References Cited

U.S. PATENT DOCUMENTS

| | | | |
|---|---|---|---|
| 3,959,776 | 5/1976 | Morley | 395/101 |
| 4,007,449 | 2/1977 | Vercesi | 395/275 |
| 4,125,874 | 11/1978 | Higashide et al. | 395/275 |
| 4,377,852 | 3/1983 | Thompson | 395/500 |
| 4,381,553 | 4/1983 | Ferguson | 395/775 |
| 4,456,994 | 6/1984 | Segarra | 395/500 |
| 4,513,373 | 4/1985 | Sheets | 395/500 |
| 4,597,058 | 6/1986 | Izumi et al. | 395/600 |
| 4,641,263 | 2/1987 | Perlman et al. | 395/500 |
| 4,688,170 | 8/1987 | Waite et al. | 395/500 |
| 4,707,803 | 11/1987 | Anthony, Jr. et al. | 395/500 |
| 4,754,428 | 6/1988 | Schultz et al. | 395/275 |
| 4,839,802 | 6/1989 | Wonak et al. | 395/275 |
| 4,879,645 | 11/1989 | Tamada | 235/380 |
| 4,933,849 | 6/1990 | Connell et al. | 364/400 |
| 4,965,771 | 10/1990 | Morikawa et al. | 395/275 |
| 4,982,324 | 1/1991 | McConaughy et al. | 395/200 |

*Primary Examiner*—Krisna Lim
*Attorney, Agent, or Firm*—Popham, Haik, Schnobrich & Kaufman, Ltd.

[57] ABSTRACT

A printer control apparatus includes a modem for receiving text data in the EBCDIC protocol and generic printer control codes from a host data base and a converter for converting the received information to drive a non-standard printer. A preprogrammed EPROM in cooperation with a CPU, converts the EBCDIC protocol language to the ASCII language. An EEPROM is remotely programmed to store printer control codes which are peculiar to the specific printer being supported.

12 Claims, 4 Drawing Sheets

PRINTER CONTROL APPARATUS FOR REMOTELY MODIFYING LOCAL PRINTER BY CONFIGURATION SIGNALS FROM REMOTE HOST TO PRODUCE CUSTOMIZED PRINTING CONTROL CODES

This is a continuation of the application Ser. No. 07/519,601 filed on May 4, 1990, now abandoned.

BACKGROUND OF THE INVENTION

1. Subject

The subject invention relates to an apparatus and method for receiving data via a telephone modem, converting the data from a first binary code to a second binary code and formatting the data for printing on a remote user's printer. More particularly the invention relates to an apparatus which can be remotely programmed over a synchronous line to perform customized data conversion for use by a printer of arbitrary configuration.

2. Description of the Prior Art

Presently data bases are accessed via such devices as telephone modems where the data is transferred from a data source, or host, to an end user desiring the data. This data is transferred over telephone lines in the form of voice/data signals, generally in one or the other of two common protocols, either EBCDIC or ASCII. Most newer printers recognize only the ASCII protocol, so if the data is transmitted in EBCDIC, a code conversion is required. Moreover, special formatting is generally required for supporting the specific needs of the printer. The required customizing is generally accomplished by a dedicated hardware interface. This severely limits the type of printer which may be employed and makes it difficult to change printing units.

It is well known to access a data base using a personal computer or the like and to cause the data base to respond by transmitting text codes and printer control codes in a generic format. Such prior art systems typically store the received information on disk or in RAM for later accessing by local software which is specially configured to drive a specific printer that happens to be connected to the computer. Such systems tie up a computer at the receiving end and are not suitable for high volume use. In high volume situations such as exist in large law offices where many lawyers are in frequent communication with a remote legal data base, it is desirable to provide central printers which are directly driven by data base transmissions.

At the present time an end user cannot simply take a standard printer and connect it to a modem in direct communication with a data base. Printers typically respond to control codes generated by a "function table". These codes provide the driving signals which cause the printer to print recognizable alphanumeric characters. They also provide the formatting which must be handled in a manner dependent upon the specific design of the printer. For example, the text must be printed across the page with a given spacing. Some printers use the so-called proportional spacing between adjacent characters which spaces the characters across the page in varying pitches depending on the number of letters or words which are written across the page on that given line. Other printers use 10 pitch or 12 pitch spacing which indicates that the spacing of the characters is 10 per inch or 12 per inch, respectively. Special codes must be generated to accomplish such spacing. Other codes are necessary to handle printing justification and to position the first line, right margin, left margin and last line of printing, to name just a few. These and other codes must be incorporated into a table, which is organized for access by the printer.

The problem which exists in the market today is that different printers generally use different formats for printing. For word processing operations, function tables are typically specified or installed with a word processing program when the system is first installed. If the software does not support the specific printer, then specialized printer function tables must be written. However, there is presently no mechanism for a remote data base to specify a printer function table or other codes which are needed by the printer to correctly format the output data into a useable output format.

One prior art patent, U.S. Pat. No. 4,754,428 to Schultz, et al shows an apparatus for distributing documents to printers having different formats. This apparatus is disclosed as being useful with electronic mail, where one originating word processing system needs to communicate with several printing stations for hard copy printing. At each location, the printers may be of a different manufacturer, thereby requiring different control codes and formats.

In Schultz et al the word processor broadcasts generalized printer commands without specific formatting codes, proceeding on the basis that most printers operate using the same general printer commands. A communicator is located serially between the text source and the printer at each printing location. The communicator receives the commands intended for the printer and simulates the operation of the printer by sending appropriate response signals to the computer or word processor. The communicator further includes a memory for storing text information which is to be displayed or printed at a later point in time. It also has a printer interface which receives generalized printer command data signals and responds by generating particular command signals in the protocol needed to drive the particular printer being used at the local station. No means are required or provided for remote programming of the communicator.

Another prior art device receives text signals from a data base in EBCDIC protocol and converts them to ASCII protocol for use in driving a dedicated ink jet printer. Protocol conversion and printer control code generation is accomplished by a hardware arrangement which is both specific and permanent.

SUMMARY OF THE INVENTION

The object of the invention then is to provide an apparatus and method for converting remotely originated voice/data signals from a first protocol to a second protocol for operation of a local printer.

Another object of the invention is to provide a protocol converter which may be remotely programmed over a synchronous line, to convert EBCDIC character codes and generic printer control codes into other codes for controlling a non-standard printer which operates under the ASCII protocol.

A further object of the invention is to provide a protocol converter which can be reformatted and reprogrammed to support changes in printer hardware.

The objects of the invention are accomplished by providing a printing control apparatus comprising a modem for receiving configuration control codes and EBCDIC data signals from a remote source, the data signals including text identifying codes and generic printer control codes. A microprocessor equipped with a fixed memory and an electrically erasable programmable memory (EEPROM) is connected to the modem for accepting the data signals, converting the text identifying codes to ASCII format and modifying the generic printer control codes to produce customized printing control codes suitable for controlling the operation of a specific predetermined printer. Data conversion is accomplished by a conventional table lookup routine. However, the table is partitioned between the fixed memory and the EEPROM, with the printer control codes being imbedded within the EEPROM. Programming of EEPROM is accomplished by the microprocessor through program instructions permanently stored in the fixed memory and in response to the configuration control codes transmitted by the remote source. A local communication port is connected to the apparatus for transmitting the converted text identifying codes and the customized printer control codes to a local printer control buffer and receiving printer response signals therefrom. The response signals are relayed to the modem for transmission to the remote source.

DETAILED DESCRIPTION OF THE PREFERRED EMBODIMENT

Figure 3:
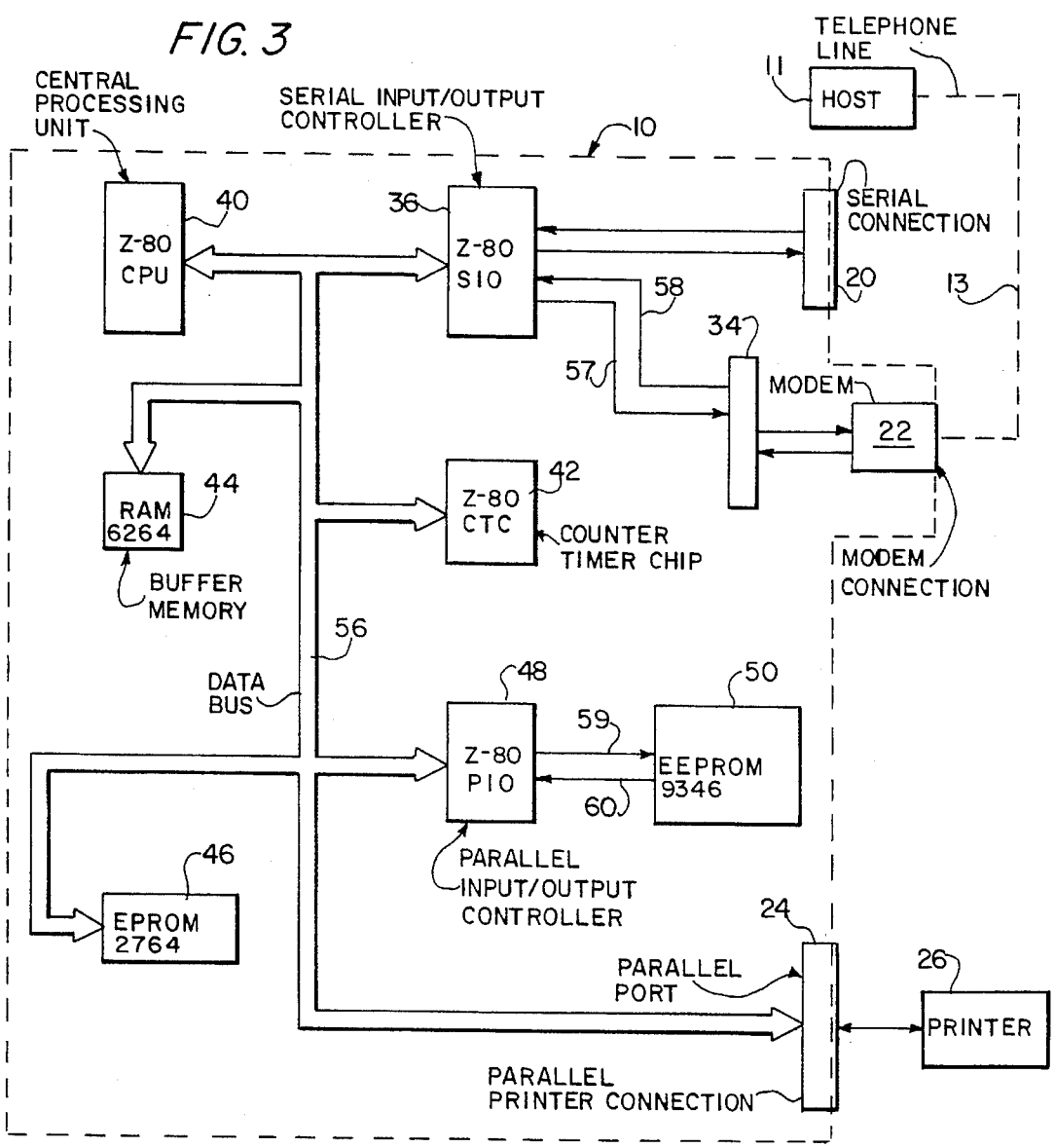
FIG. 3 is a block diagram of the printer control apparatus used in accordance with the invention whereby the data is received and converted for printing.

With reference now to the drawings, and in particular to FIG. 3, a block diagram is shown which depicts the major elements of a printer control apparatus according to the present invention and illustrates the flow of information therebetween. The apparatus as illustrated therein has particular utility for use with data bases which transmit in EBCDIC binary protocol, or a variation thereof.

It should be understood that the data base source or host 11, is the transmitting source and that signals are transmitted therefrom via standard telecommunication hardware. Typically, the signals are transmitted over a telephone line 13, and the remote user receives them through a standard telephone connection, such as an RJ-45 modular jack/plug.

The printer control apparatus is indicated generally by the reference numeral 10 of FIG. 3 and includes all of the circuitry surrounded by the peripheral dotted line. Preferably, the apparatus 10 includes three I/O ports 20, 22, and 24, where 20 is a serial connection such as an RS-232 connection; 22 is a modem I/O connection, for example, a modular jack as explained above, but it could be another suitable communication medium, such as a fiber optic link; and 24 is a parallel port, which may use a Centronics connector.

With reference still to FIG. 3, the serial I/O port 20 is directly connected to a serial I/O controller 36, while the modem connection 22 is connected directly to a modem 34 which in turn is connected to the serial I/O controller 36. In the preferred embodiment, the serial I/O controller 36 is a Zilog Z-80 SIO serial I/O chip which is a programmable two channel device. The serial I/O chip 36 is usually in the form of a dual in-line package (DIP), typically 40 pin, thus the interconnection between the modem 34 and chip 36 is via conventional circuit board connection technology.

The modem 34 demodulates the voice/data signals received from the data base at the modem connector 22. The demodulated data is then sent via a line 58, to the RXDA terminal of the serial I/O controller 36. From the serial I/O controller 36, the data is transferred to a central processing unit (CPU) 40 for converting the data from EBCDIC to ASCII. Responses from CPU 40 to host 11 are placed on data bus 56 for transmission to SIO 36, passed to modem 34 on line 57, and then relayed to telephone line 13.

In the preferred embodiment of the invention, the CPU is a Zilog Z-80 microprocessor chip. This chip has a 16-bit address bus (not illustrated) and can accommodate 64K one-byte locations of a combination of RAM and ROM. The converter 10 further includes a standard counter timer chip 42, such as a Z-80 CTC, which is connected to the CPU via data bus 56 and other connections (not illustrated) in the customary manner as recommended by the manufacturer. A volatile memory 44, is included as a buffer for the microprocessor chip, which in the preferred embodiment is a 6264 random-access memory chip (RAM). RAM 44 is connected to data bus 56 as well as to the above-mentioned 16 bit address bus.

The apparatus further includes a non-volatile memory or ROM 46. In the preferred embodiment ROM 46 may be a 2764 electrically programmable read only memory (EPROM). EPROM 46 is preprogrammed, or burnt in, for converting the protocol of the data received through the modem 34. The codes which are burned into EPROM 46 convert alphanumeric EBCDIC codes into ASCII codes as hereinafter described. A parallel input/output controller 48 is also connected to data bus 56. The AO and B5 terminals of PIO 48 are used for serial communication with an electrically erasable programmable read only memory (EEPROM) 50. In the preferred embodiment of the invention, the EEPROM 50 is an NMC 9346 having read/write memory comprising 64 separate sixteen-bit registers.

Internal programming of the CPU 40 is easily accomplished through use of a Z-80 assembler. A series of assembly language instructions are written and assembled into object code which is burned into EPROM 46. These instructions control the execution of a table lookup routine for performing the code conversion which is required during normal use of the system. The tables which provide the output codes for control of the printer are split between EPROM 46 and EEPROM 50. Specialized codes required for printer control are stored in EEPROM 50, whereas normal alphanumeric codes in ASCII format are stored in EPROM 46.

Figure 7:
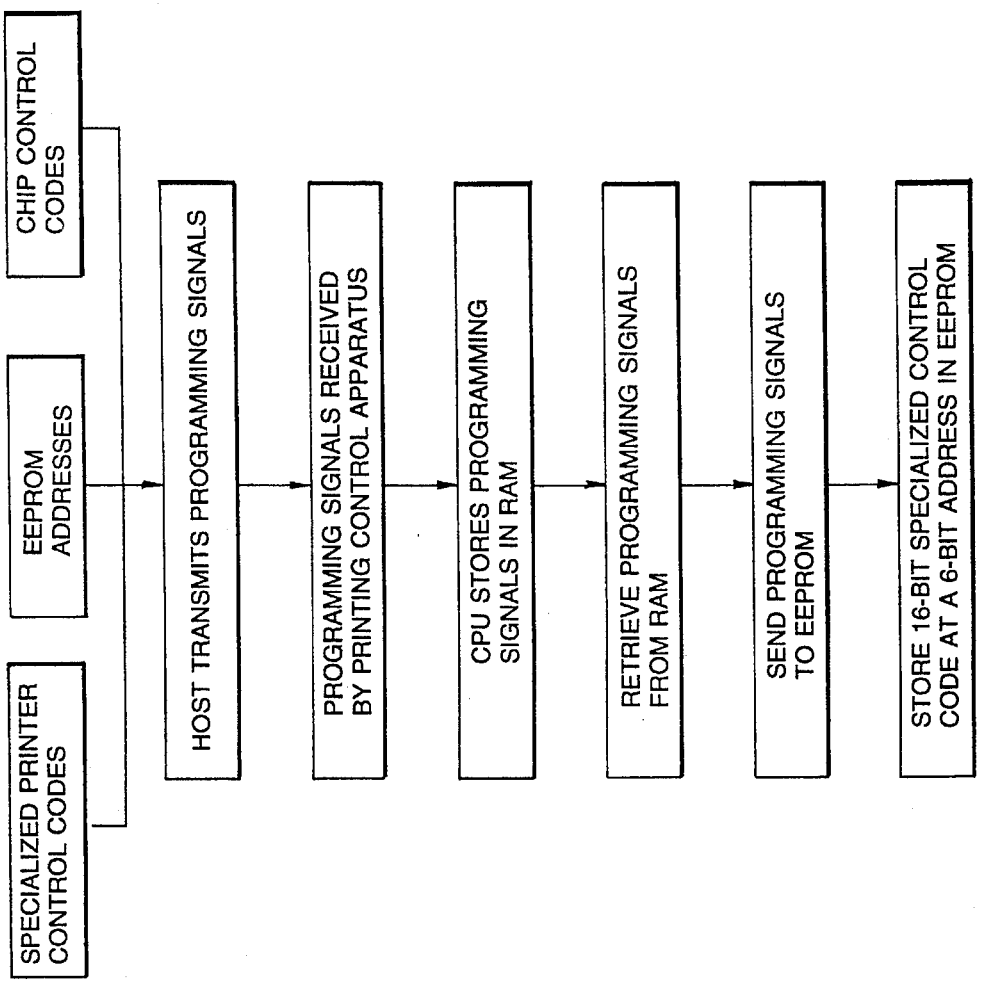
FIG. 7 is a flow diagram of how the EEPROM in the printing control apparatus is remotely programmed by a host system.
Figure 5:
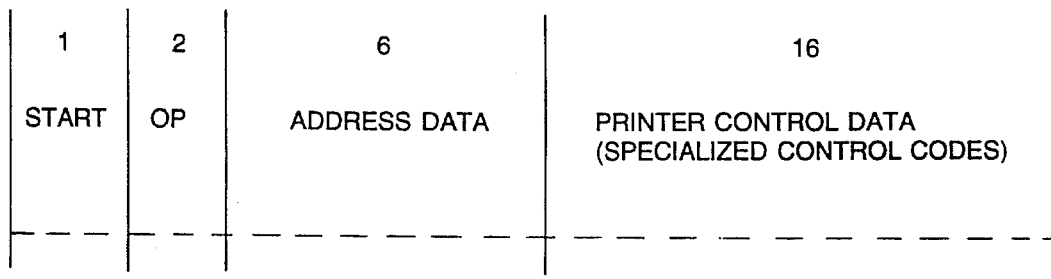
FIG. 5 illustrates the structure of a programming signal.

With reference to FIGS. 5 and 7, when customized programming of EEPROM 50 is desired, the host station transmits configuration signals comprising the appropriate printer control codes along with EEPROM addresses and chip control codes to modem 34 via modem connection 22. The EEPROM addresses point to one or more of the sixty-four 16-bit registers in EEPROM 50. The addresses and control codes are transmitted by the host in serial form and converted to a parallel format by SIO 36. This parallel data is then placed on data bus 56, sent to CPU 40 and temporarily stored in RAM 44. When EEPROM 50 is ready to be programmed, the programming instructions are retrieved from RAM 44, reconverted to serial form and placed on one of the data lines comprising data bus 56. They are then transmitted to PIO 48 and sent on line 59 to the data input line of EEPROM 50. As shown in FIG. 5, the programming signal for EEPROM 50 consists of a start bit followed by two bits of OP code, six bits of address and sixteen bits of printer control data. For programming EEPROM 50, the OP code consists of the binary designation 01. When this code appears in the data signal, EEPROM 50 is instructed to semi-permanently store the sixteen bits of data appearing at the end of the serial signal within the register indicated by the six bit address. These sixteen data bits may be recognized by the printer as a specialized control code.

Figure 6:
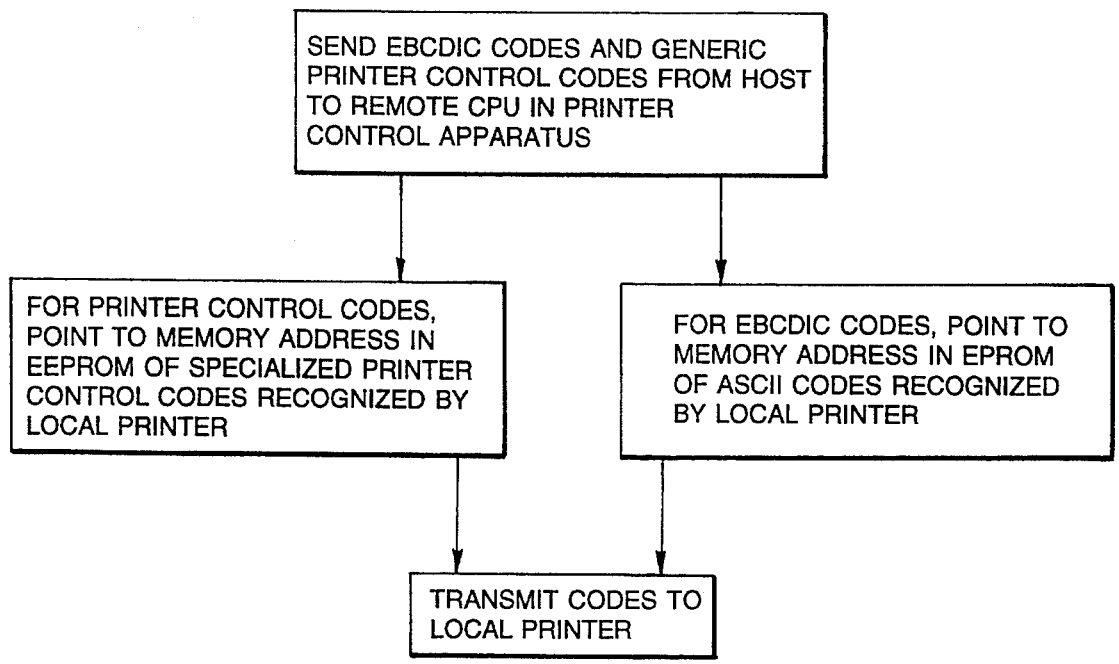
FIG. 6 is a flow diagram of how EBCDIC and generic printer control codes are converted to specialized printer control codes and ASCII codes for recognition by a local printer.

With reference to FIG. 6 during routine operation of the system CPU 40 receives a series of EBCDIC codes representing alphanumeric symbols and also a series of generic printer control codes. Each generic printer control code received by CPU 40 is recognized as such and used to generate a "read" OP code and an address for that register within EEPROM 50 which contains the specific printer code corresponding to the generic code received by the CPU. In a typical situation wherein the host is transmitting mixed EBCDIC text and generic printer control codes, the two types of information are processed in a somewhat different manner. Both code types point to memory addresses containing other codes which will be recognized by the printer, but as noted above those addresses are at different physical locations; the alphanumeric addresses being in EPROM 46 and the specialized printer control addresses being in EEPROM 50. By way of example, the EBCDIC code for the letter B is an eight-bit binary byte which corresponds to the hexadecimal number C2. EPROM 46 may have the ASCII code 42 (which is the ASCII designation for "B") stored at memory address OOC2 or at some other address which can be derived from the code "C2". When the CPU receives EBCDIC code C2, it accesses the derived memory address in EPROM 46, fetches ASCII code 42 and puts that latter code onto data bus 56 for transmission to printer 26.

In the case of a special printer control code, such as for instance, a hex code 42 C4 41 which may be used as an underscoring control code, the CPU recognizes the leading characters "42" as designating an escape sequence and addresses a memory location in EPROM 46 which is associated with the code portion C4 41. That memory location contains a vector to the particular register in EEPROM 50 which has been programmed to read out the specific ASCII code that printer 26 will recognize as a command to start underscoring. The CPU accordingly generates a serial signal including a "Read" OP code and the address pointed to by the accessed vector and sends the assembled signal to PIO controller 48 for relaying to EEPROM 50. EEPROM 50 responds on line 60 with the correct ASCII code, again in serial form. That code which, for example, may be 1B 2D 01 is sent back to CPU 40, shifted into a general-purpose register and then transmitted to printer 26 as three bytes of parallel code on data bus 56. It will be appreciated that the code 1B 2D 01 requires 24 bits of storage, whereas a single register in EEPROM 50 only has space for 16 bits. Thus in actual practice CPU 40 must access EEPROM 50 twice before it can assemble such an underlining command. This is routine programming and need not be described in further detail.

Figure 2:
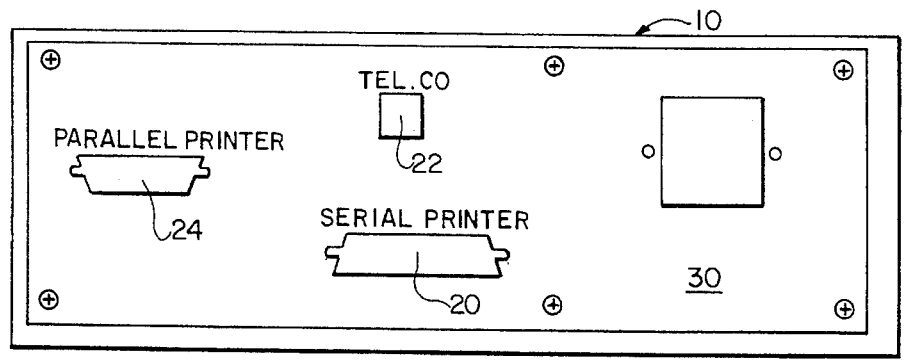
FIG. 2 is a rear plan view of the printer control apparatus of FIG. 1.

When printing control apparatus 10 is initially installed, I/O port 22 is connected to a phone line which can be reached by that host. Printer 26 is then connected either to I/O port 20 or 24, depending on whether a serial or parallel printing connection is required. These connections are made at rear panel 30 as illustrated in FIG. 2. Once these connections are made, the operator of the remote site terminal makes a phone call to the host operator, and identifies the specific printer that is to be used for printing the output data. The host operator then transmits the appropriate EEPROM programming codes to the remote location.

Once programmed, the EEPROM 50 can be remotely erased and reprogrammed. This, advantageously allows the on-site printer to be changed to a printer recognizing different printing control codes. It also allows remote correction of programming errors. After the EEPROM is programmed, the remote terminal receives a queue for further instructions from the host.

Figure 4:
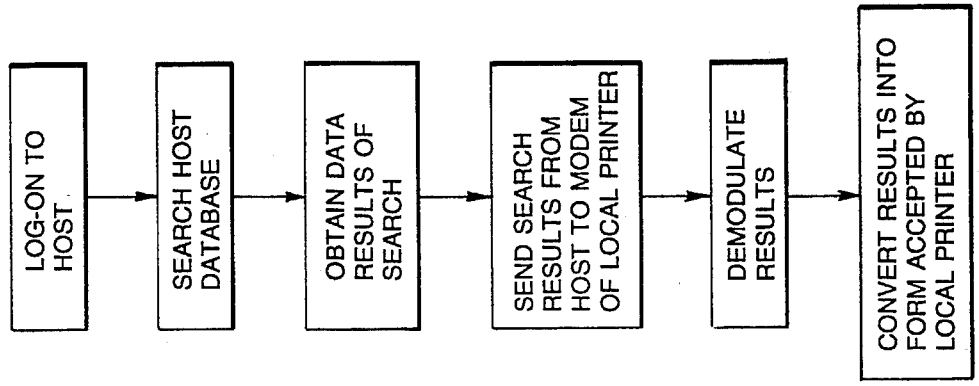
FIG. 4 is a flow diagram illustrating generally how information is transmitted from a host system to a local printer.

As shown in FIG. 4, for normal communications with the host data base, the user at the remote location initiates a simple Log-On. This includes prompts and responses for such information as passwords and user identifications, and the like. Thereafter, a search of the host data base may be made from the remote location. When the search is complete and the results are ready for printing, the search data is sent from the host to the modem, where it is demodulated, converted and sent to printer 26.

As mentioned above, the printer control apparatus 10 can supply customized printer control codes to printer 26 in response to generic codes from the host. These codes control things such as font setting, margins, underlining, justification, and the like. The apparatus 10 can also convert the EBCDIC code for the copyright symbol, English pound sterling sign, legal section symbol, and cent sign into any ASCII code desired. This allows the peripheral printer to print substitute symbols where the printer firmware does not support the transmitted symbol.

Figure 1:
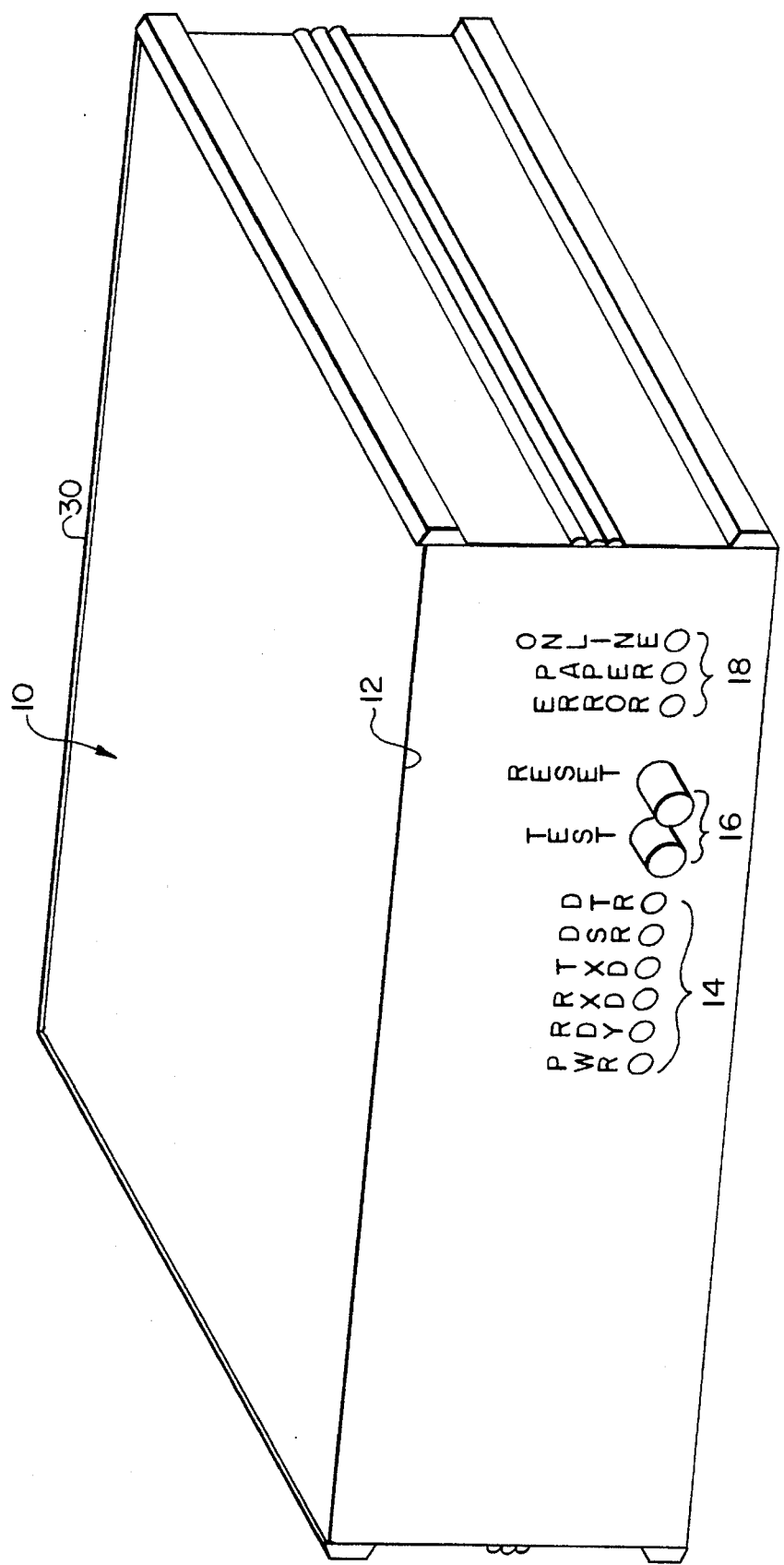
FIG. 1 is a front isometric view of the printer control apparatus of the instant invention.

The converter 10 has a diagnostic message center on the front face 12 of the converter as shown in FIG. 1. For example, PWR represents that the converter is plugged in and receiving power. The RDY light is lit when the converter is connected to a parallel printer. RXD indicates that the converter is receiving data, while the TXD indicates that the converter is sending data. The DSR light illuminates when the internal modem is ready to receive data and the DTR light illuminates when the converter 10 is ready to process data.

The front face 12 of the converter 10 also includes diagnostic lights such as 18, which indicate printing error, paper supply, and on-line conditions, respectively. It should be understood that the messages for the diagnostic lights 18 are for conditions between the converter 10 and the printer 26, which are usually sent by the printer. The messages for the diagnostic lights 14 are for conditions between the converter 10 and the host, and are generally read from the pinouts on the various internal chips.

While the form of apparatus herein described constitute a preferred embodiment of this invention, it is to be understood that the invention is not limited to this precise form of apparatus, and that changes may be made therein without departing from the scope of the invention which is defined in the appended claims.

What is claimed is:

1. Printing control apparatus connected between a remote host data source and a local printer, the printing control apparatus comprising:

communication means for receiving configuration signals and data signals of a first protocol from the host data source, said data signals including text identifying codes and generic printer control codes;

converter means, connected to said communication means for accepting said configuration signals and said data signals, converting said text identifying codes of said first protocol to text identifying codes of a second protocol, and modifying said generic printer control codes to produce customized printing control codes for controlling the operation of the local printer;

memory means, interconnected to said converter means, said memory means being programmable by said configuration signals from the remote host data source for controlling the manner in which said converter means modifies said generic printer control codes to produce said customized printing control codes, whereby the remote host data source programs the printing control apparatus to modify said generic printer control codes to produce said customized printing control codes; and a local communication port connected to said converter means for transmitting said converted text identifying codes and said customized printer control codes to the local printer.

2. The printing control apparatus of claim 1, wherein the communication means is a modem.

3. The printing control apparatus of claim 1, wherein the converter means comprises a central processing unit and a preprogrammed memory means for controlling said central processing unit.

4. The printing control apparatus of claim 3, wherein said memory means comprises a programmable read only memory.

5. The printing control apparatus of claim 3, wherein said programmable memory means comprises an electrically erasable programmable read only memory.

6. The printing control apparatus of claim 5, further comprising a parallel data bus connected to said central processing unit and a parallel input/output controller connected to said data bus; said programmable memory means being in serial communication with said parallel input/output controller.

7. The printing control apparatus of claim 5, wherein said memory means comprises a memory organized to read out ASCII printing control codes when addressed by EBCDIC printing control codes.

8. The printing control apparatus of claim 1 wherein said local communication port comprises a serial communication port.

9. The printing control apparatus of claim 1 wherein said local communication port comprises a parallel communication port.

10. Printing control apparatus comprising:

a modem for receiving configuration signals and EBCDIC data signals from a remote source, said data signals including text identifying codes and generic printer control codes;

a protocol converter means connected to said modem for accepting said data signals, converting said text identifying codes to ASCII format and modifying said generic printer control codes to produce customized printing control codes for controlling the operation of a local printer;

a programmable read only memory connected for remote programming by said configuration control codes and operative when so programmed for controlling the manner in which said protocol converter means modifies said generic printer control codes to produce said customized printing control codes, whereby said remote source programs the printing control apparatus to modify said generic printer control codes to produce said customized printing control codes; and a local communication port connected to said protocol converter means for transmitting said converted text identifying codes and said customized printer control codes to a printer control buffer found in the local printer and receiving printer response signals from said printer control buffer, and relaying said printer response signals to said modem for transmission to said remote source.

11. The printing control apparatus of claim 10, wherein said programmable read only memory is electrically erasable.

12. In a data retrieval system comprising a remote data base for storing a body of data, a converter for selectively retrieving and transmitting said body of data as a series of text identifying codes in a first protocol and generic printer control codes to a printer at a location, said local printer recognizing text identifying codes only of a second protocol different from said first protocol and requiring customized printer control codes for conducting a printing operation, a printer control apparatus comprising:

a first memory means for converting text identifying codes of said first protocol into corresponding text identifying codes of said second protocol;

a second programmable memory means for converting said generic printer control codes into corresponding customized printer control codes, said programmable memory means being programmable by the remote data base, whereby the remote data base programs the printing control apparatus to convert said generic printer control codes into said corresponding customized printer control codes;

means for delivering a series of configuration signals from said data base to said second memory means;

means responsive to said configuration signals for programming said second memory means to convert generic printing control codes to corresponding customized printer control codes;

means for receiving said text identifying codes and said generic printing codes from said data base;

means for supplying said text identifying codes, as converted, to said printer, and means for supplying said customized printer control codes to said printer.

\* \* \* \* \*